(12) United States Patent
Dhar et al.

(10) Patent No.: US 8,792,226 B2
(45) Date of Patent: Jul. 29, 2014

(54) HEAT TRANSFER SYSTEM FOR USE WITH ELECTRICAL DEVICES AND METHOD OF OPERATING THE SAME

(75) Inventors: Sandeep Dhar, Bangalore (IN); Peter James Greenwood, Cheshire, CT (US); Janaki Gadiyaram, Bangalore (IN); Manish Prasad, Secunderabad (IN)

(73) Assignee: General Electric Company, Niskayuna, NY (US)

( * ) Notice: Subject to any disclaimer, the term of this patent is extended or adjusted under 35 U.S.C. 154(b) by 189 days.

(21) Appl. No.: 13/431,324

(22) Filed: Mar. 27, 2012

(65) Prior Publication Data

US 2013/0258557 A1  Oct. 3, 2013

(51) Int. Cl.
*H05K 7/20* (2006.01)

(52) U.S. Cl.
USPC .......... 361/622; 361/605; 361/624; 361/637; 361/676; 361/677; 165/104.26; 165/104.33; 174/15.2; 174/68.2; 174/70 B; 174/71 B; 174/526

(58) Field of Classification Search
USPC ......... 361/600, 605, 611, 634, 637, 641–648, 361/675, 676, 677, 624, 626, 631, 361/679.46–679.54, 700–702, 688, 689, 361/690–695, 714, 715; 174/50.02, 16.2, 174/68.2, 68.3, 70 B, 71 B, 72 B, 88 B, 99 B, 174/133 B; 165/104.33, 185, 104.26; 312/223.2, 236; 454/184

See application file for complete search history.

(56) References Cited

U.S. PATENT DOCUMENTS

| | | | | |
|---|---|---|---|---|
| 3,681,509 A * | 8/1972 | Johnston et al. | ............. | 174/16.2 |
| 3,721,890 A * | 3/1973 | Ettinger et al. | ............... | 363/144 |
| 3,728,585 A * | 4/1973 | Olashaw | ........................ | 361/677 |
| 6,018,455 A * | 1/2000 | Wilkie et al. | .................. | 361/676 |
| 6,209,631 B1 * | 4/2001 | Garcia-Ortiz | ................. | 165/287 |
| 6,388,882 B1 | 5/2002 | Hoover et al. | | |
| 6,574,094 B1 * | 6/2003 | Morrow et al. | ............... | 361/676 |
| 6,657,121 B2 | 12/2003 | Garner | | |
| 7,079,405 B2 | 7/2006 | Tobita et al. | | |
| 7,095,612 B2 | 8/2006 | Beihoff et al. | | |

(Continued)

FOREIGN PATENT DOCUMENTS

| DE | 102011075990 A1 * | 5/2011 | ............... | H01H 1/62 |
|---|---|---|---|---|
| EP | 2562808 A1 * | 8/2011 | ............ | H01L 23/427 |
| JP | 01177807 A * | 1/1988 | ............... | H02B 1/56 |

(Continued)

*Primary Examiner* — Michail V Datskovskiy
(74) *Attorney, Agent, or Firm* — Robert M. McCarthy (57) ABSTRACT

A heat transfer system includes an electrical distribution cabinet extending about at least one current-carrying conductor. The heat transfer system also includes at least one electrically-insulating and thermally-conducting device coupled to the at least one current-carrying conductor. The heat transfer system further includes at least one heat pipe coupled to the at least one electrically-insulating and thermally-conducting device. The heat pipe is also thermally coupled to at least a portion of the electrical distribution cabinet.

18 Claims, 5 Drawing Sheets

(56) References Cited

U.S. PATENT DOCUMENTS

| | | | |
|---|---|---|---|
| 7,586,738 B1 * | 9/2009 | Hartzel et al. | 361/676 |
| 7,952,857 B1 * | 5/2011 | Motley et al. | 361/678 |
| 8,101,293 B2 | 1/2012 | Chan et al. | |
| 8,169,775 B2 * | 5/2012 | Bortoli et al. | 361/677 |
| 8,339,772 B2 * | 12/2012 | Peralta et al. | 361/676 |
| 8,437,118 B2 * | 5/2013 | Kasza et al. | 361/605 |
| 2002/0182397 A1 | 12/2002 | Whatley | |
| 2008/0239675 A1 | 10/2008 | Speier | |
| 2009/0014154 A1 | 1/2009 | Schick et al. | |
| 2012/0024506 A1 * | 2/2012 | Yano et al. | 165/135 |

FOREIGN PATENT DOCUMENTS

| | | | | |
|---|---|---|---|---|
| JP | 03234090 A * | 2/1990 | | H05K 7/20 |
| JP | 2002043783 A * | 7/2000 | | H05K 7/20 |
| WO | 2008136912 A1 | 11/2008 | | |
| WO | WO2011/051476 A1 * | 5/2011 | | H02B 13/025 |
| WO | WO2011/051477 A1 * | 5/2011 | | H02B 13/025 |

* cited by examiner

HEAT TRANSFER SYSTEM FOR USE WITH ELECTRICAL DEVICES AND METHOD OF OPERATING THE SAME

BACKGROUND

The field of the invention relates generally to electrical equipment and, more particularly, to heat transfer from an electrical component to an enclosure.

Electrical distribution equipment and components are generally required to operate within predetermined parameter ranges associated with temperatures. For example, one such parameter range defines an upper temperature rise limit for electrical equipment panels, such as electrical distribution cabinets. At least some known electrical distribution cabinets include a plurality of copper or aluminum busbars that are arranged and configured to be physically and electrically isolated from each other. These busbars are current-carrying conductors that are used to distribute electric power within associated electrical distribution systems. As current is transmitted through the busbars, heat is generated by mechanisms that include $I^2R$ losses. Known heat removal mechanisms for these electrical distribution cabinets include circulating air within the cabinets, thereby relying primarily on convective heat transfer within the cabinets to remove the heat generated by the busbars from the vicinity of the busbars. As the temperature of the internally-recirculated air increases, a margin to predetermined temperature-related operating parameters within the cabinet is decreased. Additionally, as a need for increasing electric power transmission density through limited physical space evolves, the space available to increase the size of the busbars and the distance separating them becomes constraining.

Also, mechanical coupling hardware is typically used in electrical distribution cabinets to facilitate electrical contact between adjoining busbars. Such mechanical coupling hardware also facilitates increased localized electrical resistance and localized "hotspots." Therefore, additional heat removal capacity is needed to maintain the temperatures of these localized hotspots within predetermined parameters.

Furthermore, some known configurations using devices for facilitating faster heat transfer, such as phase change heat transfer through heat pipes, from the busbars more effectively are limited because these devices are electrically conducting and generally cannot be placed directly into electrical contact with an enclosure since the electrically-energized contents may present a risk of electrical conduction to the enclosure.

BRIEF DESCRIPTION

In one aspect, a heat transfer system is provided. The heat transfer system includes an electrical distribution cabinet extending about at least one current-carrying conductor. The heat transfer system also includes at least one electrically-insulating device coupled to the at least one current-carrying conductor. The heat transfer system further includes at least one heat pipe coupled to the at least one electrically-insulating and thermally-conducting device. The heat pipe is also thermally coupled to at least a portion of the electrical distribution cabinet.

In a further aspect, an electrical distribution cabinet is provided. The electrical distribution cabinet includes at least one current-carrying conductor and at least one electrically-insulating and thermally-conducting device coupled to the at least one current-carrying conductor. The electrical distribution cabinet also includes at least one heat pipe coupled to the at least one electrically-insulating and thermally-conducting device. The heat pipe is also thermally coupled to at least a portion of the electrical distribution cabinet.

In another aspect, a method of removing heat from an electrical distribution cabinet is provided. The electrical distribution cabinet includes at least one current-carrying conductor. The method includes energizing the at least one current-carrying conductor and transferring heat from the at least one current-carrying conductor through at least one electrically-insulating and thermally-conducting device. The method also includes transferring heat from the electrically-insulating and thermally-conducting device to a portion of the electrical distribution cabinet through a heat pipe.

DRAWINGS

These and other features, aspects, and advantages of the present invention will become better understood when the following detailed description is read with reference to the accompanying drawings in which like characters represent like parts throughout the drawings, wherein.

Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
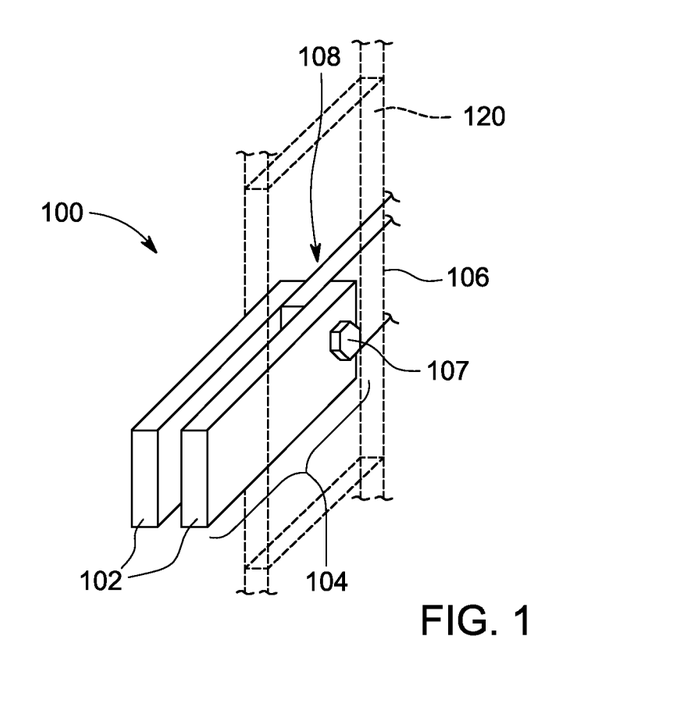
FIG. 1 is a perspective view of a portion of an exemplary busbar.
Figure 2:
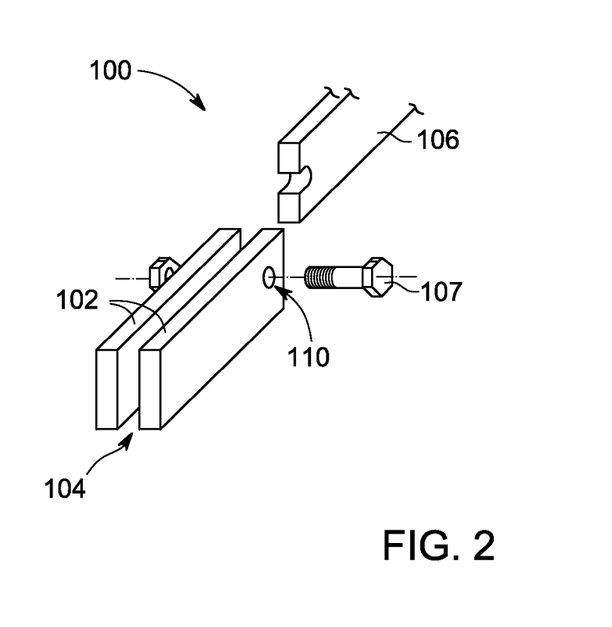
FIG. 2 is an exploded view of the portion of the busbar shown in FIG. 1.

FIG. 1 is a perspective view of a portion of an exemplary current-carrying conductor, i.e., busbar 100. FIG. 2 is an exploded view of the portion of busbar 100 shown in FIG. 1. Busbar 100 is an example of a current-carrying conductor configured to transmit electricity, i.e., metals such as, without, limitation, copper and aluminum. In the exemplary embodiment, busbar 100 includes two opposing, parallel metal plates 102 that define discrete busbar sections 104 (only one shown). Sections 104 are coupled to each other through a connector 106 using fastening hardware 107 through passages 110, thereby forming a busbar joint 108. An electrically-insulating device 120 (shown in phantom) is coupled to busbar joint 108.

Figure 3:
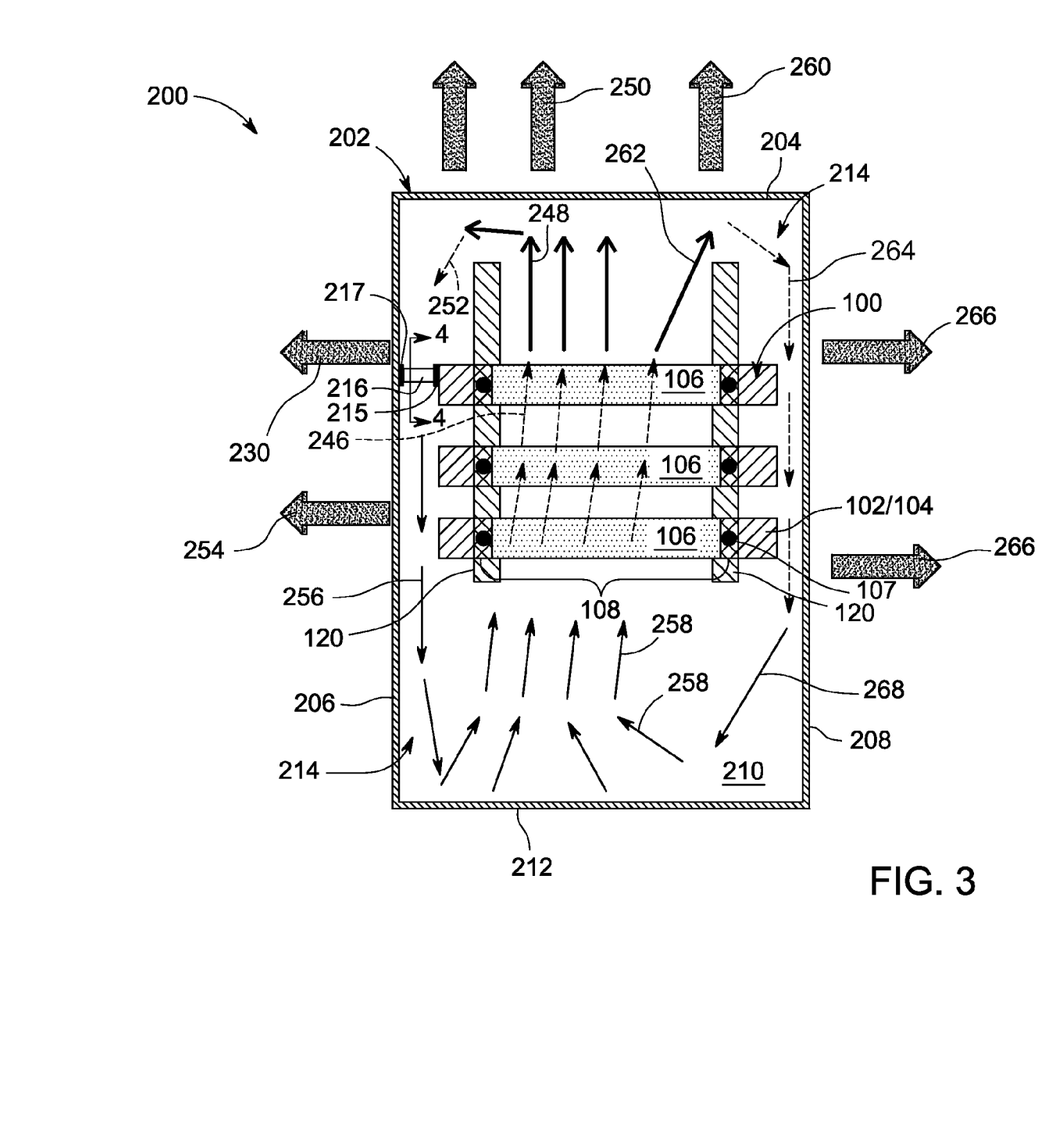
FIG. 3 is a schematic view of an exemplary heat transfer system that may be used to remove heat from the busbar shown in FIGS. 1 and 2.

FIG. 3 is a schematic view of an exemplary heat transfer system 200 that may be used to remove heat from a plurality of busbars 100. In the exemplary embodiment, heat transfer system 200 includes an exemplary electrical enclosure, i.e., electrical distribution cabinet 202 that encloses a plurality of busbars 100. Electrical distribution cabinet 202 may include a top portion 204, a first side portion 206, a second side portion 208, a back portion 210, a bottom portion 212, and a front access door (not shown). Portions 204, 206, 208, 210, 212, and the front access door define an interior compartment 214. Busbars 100 extend substantially horizontal to, and parallel to, bottom portion 212. Also, some busbars (not shown in FIG. 3) extend substantially vertical to, and orthogonal to, bottom portion 212 within interior compartment 214.

Also, in the exemplary embodiment, electrical distribution cabinet 202 includes a plurality of electrically-insulating devices 120 that may be coupled to each of busbars 100 and extend substantially vertically and orthogonally to busbars 100 within interior compartment 214. Electrically-insulating devices 120 may be formed from a glass-based non-conductive material, e.g., without limitation, cellular glass and fiberglass. Alternatively, electrically-insulating devices 120 may be formed from any materials that enable operation of heat transfer system 200 as described herein. Electrically-insulating devices 120 facilitate separation and alignment of busbars 100.

Further, in the exemplary embodiment, heat transfer system 200 includes at least one thermally-conductive device, i.e., heat pipe 216, coupled to one of bus bars 100 through a first electrically-insulating and thermally-conducting device 215. Also, heat pipe 216 is coupled to first side portion 206 of electrical distribution cabinet 202 through a second electrically-insulating and thermally-conducting device 217. Both couplings can be achieved using any method that enables operation of heat transfer system 200 as described herein, including, without exception, thermally-conducting epoxies and mounting hardware. Alternatively, heat transfer system 200 includes a plurality of heat pipes 216, e.g., at least one heat pipe 216 coupled to each electrically-insulating device 120. Also, alternatively, heat pipe 216 may be coupled to any busbar 100 and any portion of electrical distribution cabinet 202 that enables operation of system 200 as described herein. Electrical distribution cabinet 202 is substantially closed to air ingress and egress, i.e., when the front access door is closed, air flow through interior compartment 214 is substantially limited to recirculation of air therein with substantially no volumetric air flow communication with ambient air.

Heat pipe 216 may be formed from metallic substances, e.g., without limitation, copper-based alloys. First and second electrically-insulating and thermally-conducting devices 215 and 217, respectively, may be formed from a thermally-conducting polymeric substance, such as manufactured composite polymers, including, without limitation, polyaniline, polypyyrole and polythiophenes.

Figure 4:
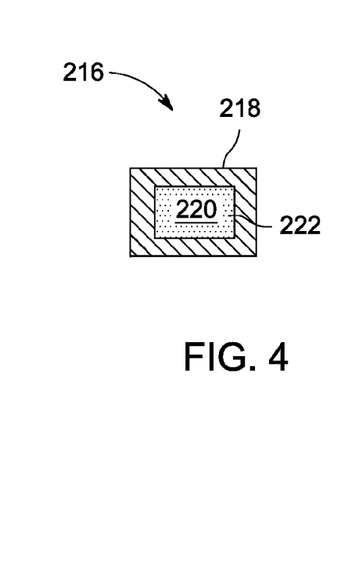
FIG. 4 is a cross-sectional schematic view of a heat pipe that may be used with the heat transfer system shown in FIG. 3 and taken along line 4-4.

FIG. 4 is a cross-sectional schematic view of heat pipe 216 that is positioned within electrical distribution cabinet 202 (shown in FIG. 3) and taken along line 4-4 (shown in FIG. 3). In the exemplary embodiment, heat pipe 216 includes a substantially rectangular conduit 218. Alternatively, conduit 218 has any shape that enables operation of heat transfer system 200 as described herein. Conduit 218 is formed from a thermally-conductive material such as metallic substances, without limitation, without limitation, copper-based alloys.

Also, in the exemplary embodiment, conduit 218 is hollow and defines a passageway 220 extending therethrough between first and second electrically-insulating and thermally-conducting devices 215 and 217, respectively (both shown in FIG. 3). In one embodiment, passageway 220 has a rectangular cross-section. However, other shapes are possible. Passageway 220 is at least partially filled with a liquid 222. Liquid 222 is any substance, or combination of substances, that change phase from liquid to vapor when a surface temperature of conduit 218 attains a predetermined temperature due to heat transferred from electrically-insulating device 120 and/or air in interior compartment 214 (shown in FIG. 3), including, without limitation, methanol. In at least some embodiments, electrically-insulating devices 120 may be filled with liquid 222. Heat pipe 216 may be oriented within interior compartment 214 at an incline (not shown) such that vapor bubbles rise towards first side portion 206.

Figure 5:
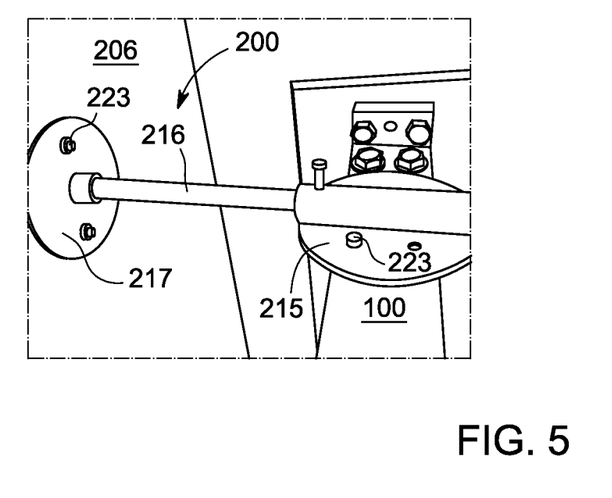
FIG. 5 is a schematic view of a portion of the heat transfer system shown in FIG. 3 taken along area 5.

FIG. 5 is a schematic view of a portion of heat transfer system 200 taken along area 5 (shown in FIG. 3). In the exemplary embodiment, first electrically-insulating and thermally-conducting device 215 is coupled to a top of horizontal busbar 100 with mechanical fastening hardware 223. Second electrically-insulating and thermally-conducting device 217 is coupled to first side portion 206 with mechanical fastening hardware 223. Heat pipe 216 is coupled to each of first and second electrically-insulating and thermally-conducting devices 215 and 217, respectively, using any method that enables operation of system 200 as described herein, including, without limitation, an interference fit, sealing rings, and epoxies to facilitate containing liquid 222 within passageway 220 (both shown in FIG. 4).

Figure 6:
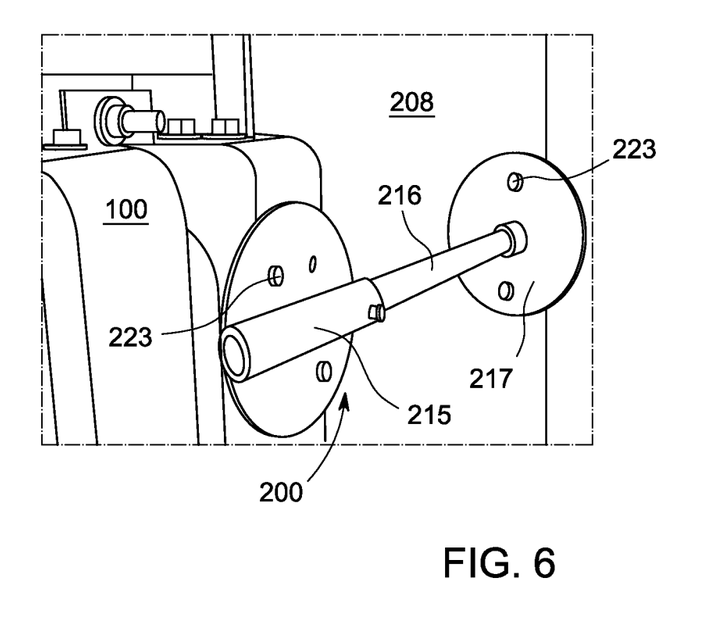
FIG. 6 is a schematic view of a portion of the heat transfer system shown in FIG. 3.

FIG. 6 is a schematic view of an alternative portion of heat transfer system 200, wherein first electrically-insulating and thermally-conducting device 215 is coupled to a side of vertical busbar 100 with mechanical fastening hardware 223. Also, second electrically-insulating and thermally-conducting device 217 is coupled to second side portion 208 with mechanical fastening hardware 223.

Figure 7:
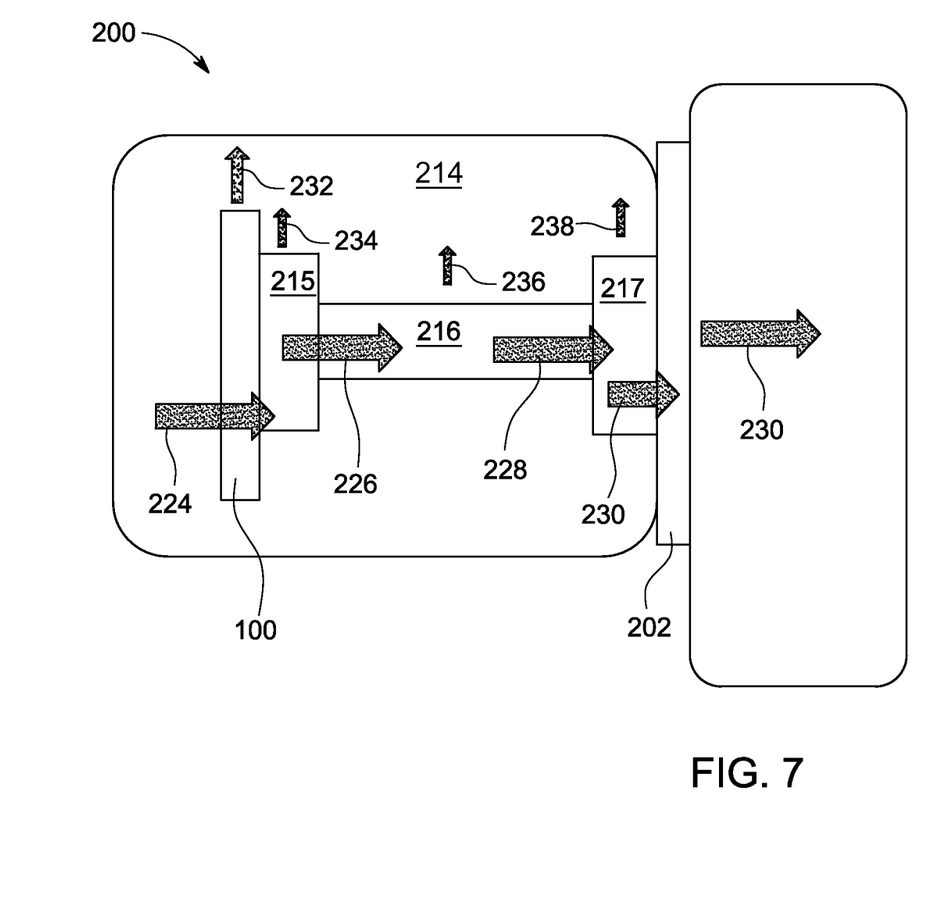
FIG. 7 is a schematic view of exemplary heat transfer mechanisms through the heat transfer system shown in FIG. 3.

FIG. 7 is a schematic view of exemplary heat transfer mechanisms through heat transfer system 200. referring to FIGS. 3, 4, 5, 6, and 7, in operation, at least one of busbars 100 is electrically energized. As current is transmitted through busbars 100, heat is generated by mechanisms that include $I^2R$ losses. Busbar joints 108 with a heightened localized electrical resistance may induce localized "hotspots" at busbar joints 108. In general, temperatures within cabinet interior 214 are maintained at approximately 51 degrees Celsius (° C.) (124 degrees Fahrenheit (° F.)) and ambient temperature is approximately 38° C. (100° F.). Alternatively, any operating temperatures for cabinet interior 214 and ambient conditions are used that enable operation of busbars 100 as described herein.

Heat 224 is conducted from busbars 100 into first electrically-insulating and thermally-conducting device 215. A portion 226 of heat 224 is conducted from first electrically-insulating and thermally-conducting device 215 into conduit 218 of heat pipe 216. At least a portion (not shown) of heat 226 transferred into conduit 218 is transferred into fluid 222 and at least a portion (not shown) of fluid 222 undergoes a first phase change to a vapor. Vapor bubbles (not shown) rise through fluid 222 within passageway 220 toward second electrically-insulating and thermally-conducting device 217. Also, at least a portion 228 of heat 226 transferred into conduit 218 is transferred to second electrically-insulating and thermally-conducting device 217. At least a portion 230 of heat 228 is conducted to either first side portion 206 or second side portion 208 of electrical distribution cabinet 202 and is subsequently transferred to ambient air through convection. The vapor bubbles in fluid 222 are condensed and the cooled fluid is returned downward through heat pipe 216 via natural circulation induced by gravitational forces.

Heat is also transferred into the air within interior compartment 214 from busbars 100 and portions of system 200. Specifically, heat 232 generated from some busbar losses are transferred convectively into interior compartment 214. Also, a portion 234 of heat 224, a portion 236 of heat 226, and a portion 238 of heat 228, are transferred convectively into interior compartment 214

Warmer air 246 rises through busbars 100 and absorbs heat 232 to form hotter air 248 that rises above busbars 100. Hotter air 248 contacts top portion 204 of electrical distribution cabinet 202 and transfers heat 250 via conduction through top portion 204 into ambient air above cabinet 202. Also, heat 236 from heat pipe 216 may be transferred into the circulating air in interior compartment 214. Cooler air 252 with a slightly greater density than hotter air 248 is transported downward against first side portion 206 and remaining heat 254 is conducted through portion 206 and convection transfers heat 254 into ambient air. Cold air 256 continues to fall to bottom portion 212 and rising air 258 travels with an induced upward motion.

Heat 246 is further transferred from hot air 262 through top portion 204 into ambient air above cabinet 202. Cooler air 264 with a slightly greater density than hot air 262 is transported downward against second side portion 208 and remaining heat 266 is conducted through portion 208 and convection transfers heat 266 into ambient air. Cold air 268 continues to fall to bottom portion 212 and rising air 258 travels with an induced upward motion.

Figure 8:
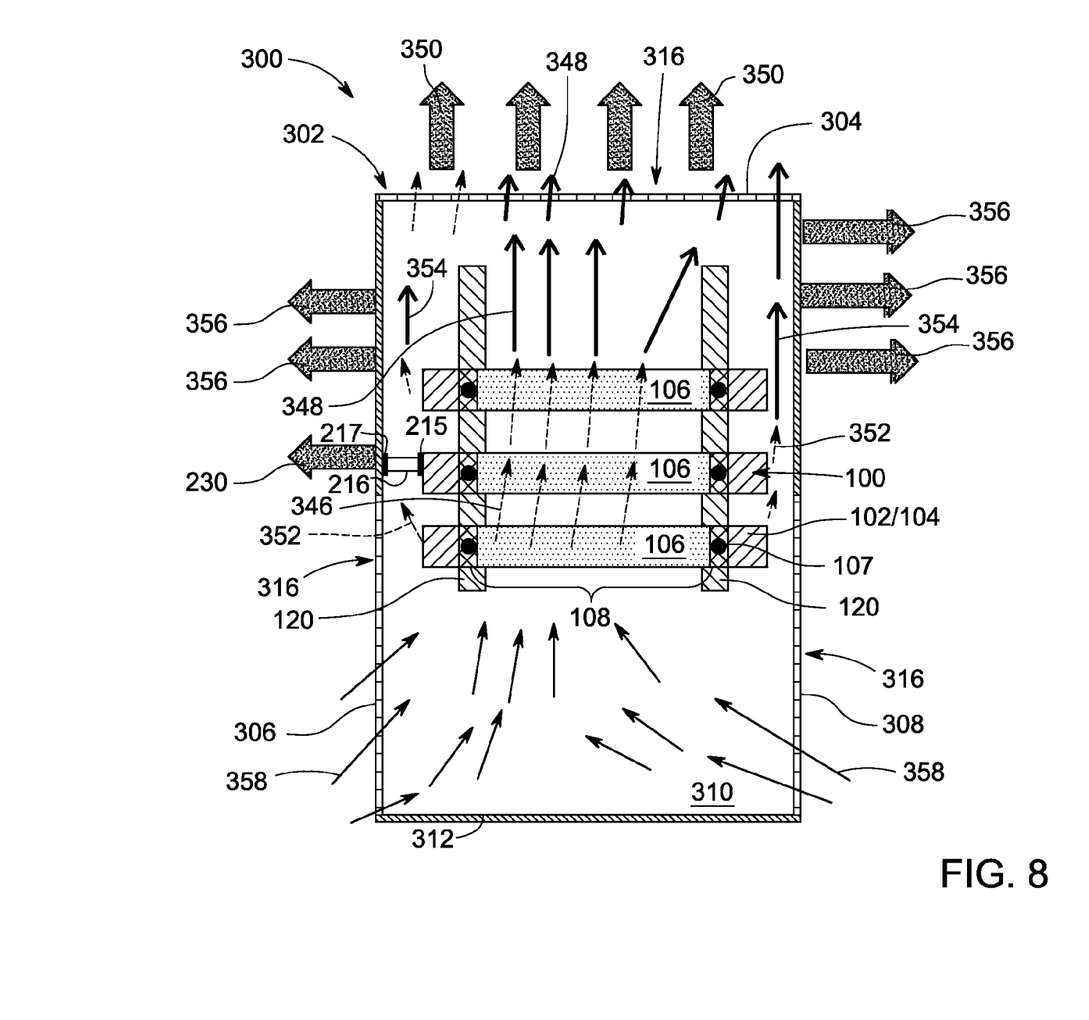
FIG. 8 is a schematic view of an alternative exemplary heat transfer system that may be used to remove heat from the busbar shown in FIGS. 1 and 2.

FIG. 8 is a schematic view of an alternative exemplary heat transfer system 300 that may be used to remove heat from a plurality of busbars 100. Heat transfer system 300 is similar to heat transfer system 200 (shown in FIG. 3), with the exception that system 300 includes an alternative electrical distribution cabinet 302. Cabinet 302 includes an alternative top portion 304, first side portion 306, second side portion 308, back portion 310, bottom portion 312, and front access door (not shown) to define an alternative interior compartment 314, wherein portions 304, 306, 308, and the front access door include a plurality of vent openings 316. Vent openings 316 facilitate egress and ingress of air through interior compartment 314.

Operation of heat transfer system 300 is similar to operation of heat transfer system 200 with the following exceptions. Heat is transferred to air within interior compartment 314 from busbars 100. Warmer air 346 rises through busbars 100 and absorbs additional heat to form hotter air 348 that rises above busbars 100. Heat 350 that is carried by the air is discharged from electrical distribution cabinet 302 through vent openings 316 of top portion 304 into ambient air above cabinet 302. Also, some heat from busbars 100 is transferred to the air within interior compartment 314 to create warmer air 352 that absorbs more heat from busbars 100 and creates hotter air 354. Hotter air 354 contacts first side portion 306 and second side portion 308 and heat is conducted through portions 306 and 308 and convection transfers heat 356 to ambient air. Hotter air 354 is discharged from electrical distribution cabinet 302 through vent openings 316 in top portion 304 into ambient air above cabinet 302. Cold air 358 is pulled into interior compartment 314 through vent openings 316 in first side portion 306 and second side portion 308. Therefore, a natural circulation of air is induced within interior compartment 314.

The above-described heat transfer system provides a cost-effective method for increasing capacity and reliability of electrical devices. The embodiments described herein facilitate using thermally-conductive and electrically-isolating devices and/or materials as heat sinks to absorb heat from a current path and to transfer that heat to ambient air through the surface of an enclosure. Specifically, the devices, systems, and methods described herein facilitate dissipating heat from an electrical device by using a primarily electrically-insulating device, a primarily thermally-conductive device, and an enclosure for electrical equipment, all serially coupled in thermal communication. More specifically, the devices, systems, and methods described herein use a first device that is electrically-isolating and thermally conductive coupled to busbars. The devices, systems, and methods described herein also use a second device coupled to the first device, wherein the second device is a heat pipe filled with a dual-phase fluid, the heat pipe formed from a thermally-conducting material. The devices, systems, and methods described herein also use a third device coupled to the second device, wherein the third device is similar to the first device. The devices, systems, and methods described herein further use an enclosure as the final heat sink coupled to the third device.

Moreover, the devices, systems, and methods described herein facilitate heat transfer from the busbars to the electrically-insulating, thermally-conducting device. The heat is then transferred to the heat pipe that is thermally-conductive. Gas bubbles are formed in the liquid in the heat pipe and are transported through the heat pipe through natural circulation. Heat is also conductively transferred through the heat pipe to the enclosure via another electrically-insulating, thermally-conducting device. The gas in the heat pipe is condensed back into liquid in the vicinity of the enclosure. The devices, systems, and methods described herein facilitate enabling improved heat transfer out of the interior of the electrical enclosure and into an ambient environment to maintain internal operating temperatures of the electrical components within the electrical enclosure within predetermined tolerances. Moreover, the heat may be transferred a predetermined distance from the heat source to the heat sink. Therefore, the devices, systems, and methods described herein facilitate performance enhancements that include, for example, reducing an amount of copper that is used to assemble a busbar, while facilitating increased current ratings in the associated electrical enclosure. Increased ratings and reduced materials and size of components and cabinets facilitate reducing costs of assembling and installing electrical equipment systems.

An exemplary technical effect of the methods, systems, and apparatus described herein includes at least one of: (a) increasing a rate of heat transfer from electrical "hotspots"; (b) increasing the rate of heat transfer to a larger effective surface area; (c) decreasing an amount of metal needed to fabricate busbars; (d) increasing a density of busbars in an electrical distribution cabinet; (e) facilitating maintenance of temperatures within an electrical distribution cabinet within predetermined parameters; (f) reducing a potential for derating of circuit breakers, busbars, and other electrical devices in electrical equipment cabinets due to high temperatures; (g) reducing physical footprints of circuit breakers and busbars for predetermined current and voltage ratings; and (h) increasing a distance between a heat source and a heat sink within an electrical distribution cabinet.

Exemplary embodiments of heat transfer systems for electrical enclosures and methods for operating are described above in detail. The heat transfer systems, electrical enclosures, and methods of operating such systems and enclosures are not limited to the specific embodiments described herein, but rather, components of systems and/or steps of the methods may be utilized independently and separately from other components and/or steps described herein. For example, the methods may also be used in combination with other systems requiring heat removal and methods, and are not limited to practice with only the heat transfer systems, electrical enclosures, and methods as described herein. Rather, the exemplary embodiment can be implemented and utilized in connection with many other electrical applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heat transfer system comprising:
   an electrical distribution cabinet extending about at least one busbar;
   at least one electrically-insulating and thermally-conducting device mechanically coupled to the at least one busbar; and
   at least one heat pipe coupled to said at least one electrically-insulating and thermally-conducting device and thermally coupled to at least a portion of said electrical distribution cabinet.

2. The heat transfer system in accordance with claim 1, wherein said at least one electrically-insulating and thermally-conducting device comprises a thermally-conducting polymeric material.

3. The heat transfer system in accordance with claim 1, wherein said at least one heat pipe comprises a thermally-conducting material.

4. The heat transfer system in accordance with claim 3, wherein said at least one heat pipe comprises a metallic substance.

5. The heat transfer system in accordance with claim 1, wherein:
   said at least one electrically-insulating and thermally-conducting device coupled to the at least one busbar comprises a first electrically-insulating and thermally-conducting device; and
   said at least one heat pipe is coupled to said first electrically-insulating and thermally-conducting device and a second electrically-insulating and thermally-conducting device, wherein said second electrically-insulating and thermally-conducting device is coupled to said at least a portion of said electrical distribution cabinet.

6. The heat transfer system in accordance with claim 1, wherein said electrical distribution cabinet is substantially closed to air ingress and egress.

7. The heat transfer system in accordance with claim 1, wherein said electrical distribution cabinet is open to air ingress and egress.

8. An electrical distribution cabinet comprising:
   at least one busbar;
   at least one electrically-insulating and thermally-conducting device mechanically coupled to said at least one busbar; and
   at least one heat pipe coupled to said at least one electrically-insulating and thermally-conducting device and thermally coupled to at least a portion of said electrical distribution cabinet.

9. The electrical distribution cabinet in accordance with claim 8, wherein said at least one electrically-insulating and thermally-conducting device comprises a thermally-conducting polymeric material.

10. The electrical distribution cabinet in accordance with claim 8, wherein:
    said at least one electrically-insulating and thermally-conducting device coupled to said at least one busbar comprises a first electrically-insulating and thermally-conducting device; and
    said at least one heat pipe is coupled to said first electrically-insulating and thermally-conducting device and a second electrically-insulating and thermally-conducting device, wherein said second electrically-insulating and thermally-conducting device is coupled to said at least a portion of said electrical distribution cabinet.

11. The electrical distribution cabinet in accordance with claim 8, wherein said electrical distribution cabinet is substantially closed to air ingress and egress.

12. The electrical distribution cabinet in accordance with claim 8, wherein said electrical distribution cabinet is open to air ingress and egress.

13. A method of removing heat from an electrical distribution cabinet including at least one busbar, said method comprising:
    energizing the at least one busbar;
    transferring heat from the at least one busbar through at least one electrically-insulating and thermally-conducting device, wherein the at least one electrically-insulating and thermally-conducting device is mechanically coupled to the at least one busbar; and
    transferring heat from the at least one electrically-insulating and thermally-conducting device to a portion of the electrical distribution cabinet through a heat pipe.

14. The method in accordance with claim 13, wherein transferring heat from the at least one electrically-insulating and thermally-conducting device to a portion of the electrical distribution cabinet through a heat pipe comprises transferring heat from a first electrically-insulating and thermally-conducting device to the heat pipe.

15. The method in accordance with claim 14, wherein transferring heat from the at least one electrically-insulating and thermally-conducting device to a portion of the electrical distribution cabinet through a heat pipe comprises transferring heat from the heat pipe to the electrical distribution cabinet through a second electrically-insulating and thermally-conducting device.

16. The method in accordance with claim 13, wherein transferring heat from the at least one electrically-insulating and thermally-conducting device to a portion of the electrical distribution cabinet through a heat pipe comprises transferring heat from the at least one electrically-insulating and thermally conductive device to a thermally-conducting conduit of the heat pipe defining a passageway therein.

17. The method in accordance with claim 16, wherein transferring heat from the at least one electrically-insulating and thermally conductive device to a thermally-conducting conduit of the heat pipe defining a passageway therein comprises:
   transferring heat from the at least one busbar through a first electrically-insulating and thermally conductive device into a heat pipe defining a passageway therein that is at least partially filled with a liquid;
   inducing a first phase change in at least a portion of the liquid as heat is transferred into the heat pipe, thereby generating at least some vapor; and
   inducing a second phase change in at least a portion of the vapor as heat is transferred from the heat pipe into the electrical distribution cabinet, thereby condensing at least a portion of the vapor within the passageway.

18. The method in accordance with claim 13 further comprising transferring heat from the electrical distribution cabinet to ambient air.

* * * * *